Aug. 14, 1956     C. E. NORMAN     2,759,079
ELECTRIC INDICATOR

Filed Oct. 26, 1953     2 Sheets-Sheet 1

Clifton E. Norman
INVENTOR.

BY *Clarence A. O'Brien*
*and Harvey B. Jackson*
Attorneys

Aug. 14, 1956
C. E. NORMAN
2,759,079
ELECTRIC INDICATOR
Filed Oct. 26, 1953
2 Sheets-Sheet 2
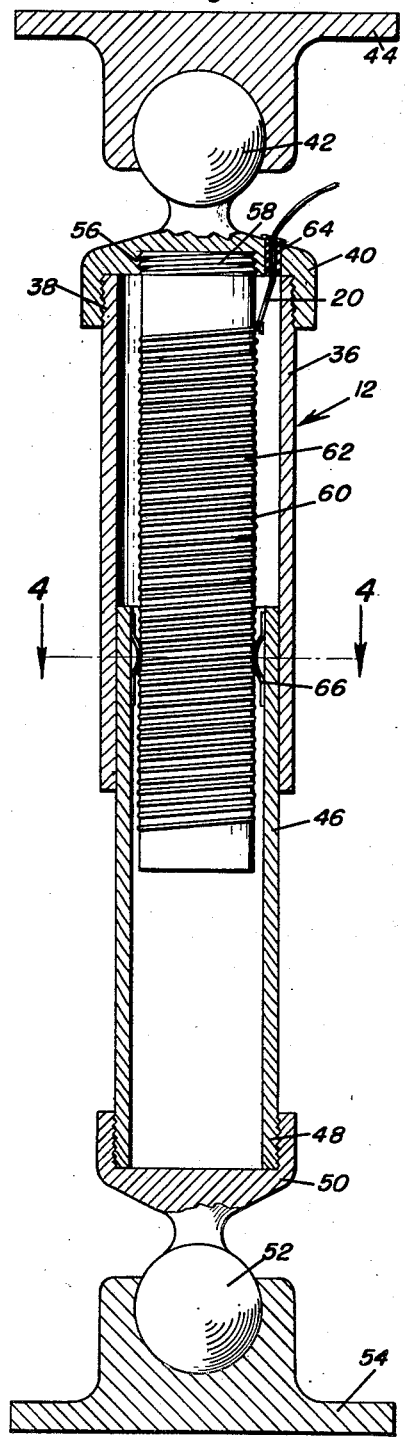
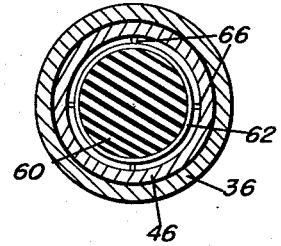
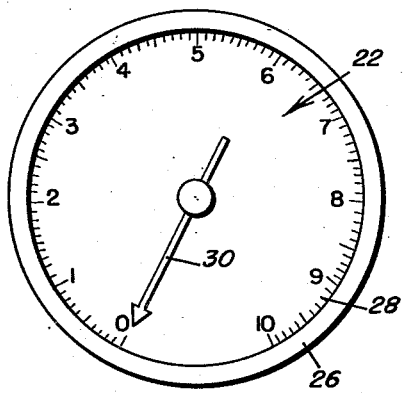
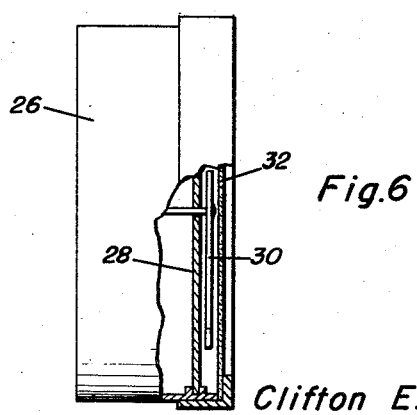
Clifton E. Norman
INVENTOR.

United States Patent Office 2,759,079
Patented Aug. 14, 1956

2,759,079

ELECTRIC INDICATOR

Clifton E. Norman, Milton, N. J., assignor of fifty per cent to F. L. Hopkinson, Milton, N. J.

Application October 26, 1953, Serial No. 388,203

2 Claims. (Cl. 201—62)

This invention relates to a weight indicator for vehicles and more particularly to a novel apparatus for providing an indication of the load that a truck or a similar vehicle is carrying.

The construction of this invention features the provision of a visual indicator or instrument adapted to be placed on the instrument board of a vehicle which is adapted to record in tons and fractions thereof the actual hauling load present on a truck at any particular time. Thus, utilizing the present apparatus, the operator of a truck can determine the precise amount of material being placed on his truck, thereby enabling a proper and full load to be placed on a truck without any fear of overloading while also avoiding the annoyance and expense of the utilization of a public scales for the customary weighing.

Incorporated in this invention is a novel variable electrical resistor which includes an insulative core extending between two telescoping tubular members, each of which carries ball and socket end members for attachment to an axle of the vehicle and to a part of the frame thereof. The utilization of the ball and socket joint enables the device to be resistant against distortion of any of its parts and against wear due to lurchings or bumping experienced by the truck or vehicle when traveling over uneven roads.

Still further objects and features of this invention reside in the provision of a weight indicating apparatus for vehicles that is strong and durable, simple in construction and manufacture, capable of being readily installed on various types of vehicles at a very low expense thereby enabling wide distribution to the trade.

These, together with the various ancillary objects which will become apparent as the following description proceeds, are attained by this weight indicator for vehicles, a preferred embodiment of which has been illustrated in the accompanying drawings, by way of example only, wherein:

Figure 3 is an enlarged sectional view illustrating the novel variable electrical resistor comprising one of the most important elements of this invention;

Figure 4 is a sectional detail view as taken along the plane of line 4—4 in Figure 3 and illustrating the manner in which the spring contacts mounted on the inner tubular member engage the coils wrapped about the core;

Figure 5 is an elevational view illustrating an indicating instrument which may be installed on the instrument board of a vehicle; and Figure 6 is a side elevational view of the indicating instrument with parts thereof being broken away to show other parts in section for greatest detail.

Figure 1:
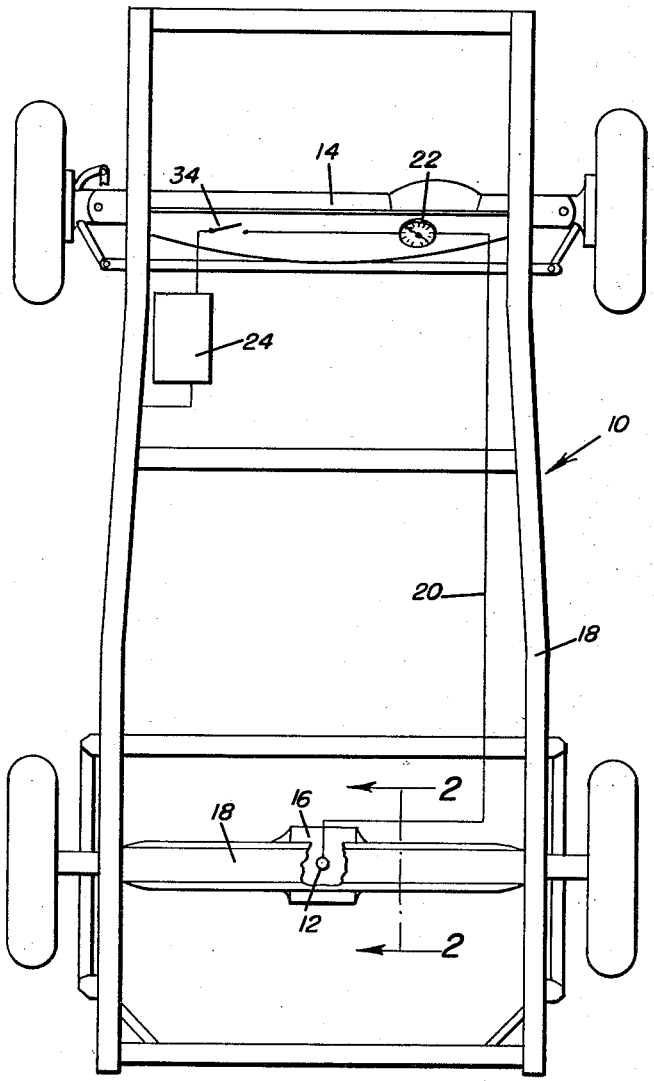
Figure 1 is a plan view schematically illustrating the manner in which the apparatus is secured on a vehicle.
Figure 2:
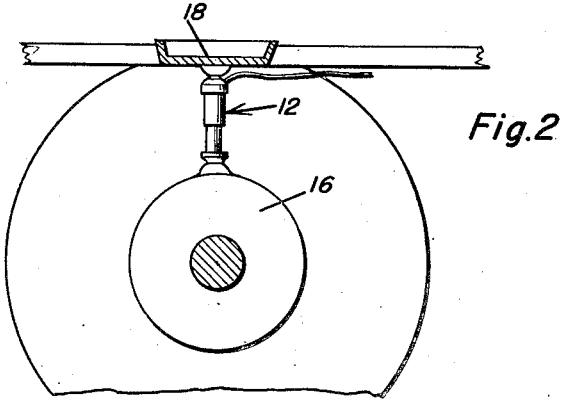
Figure 2 is a sectional detail view as taken along the plane of line 2—2 in Figure 1.

With continuing reference to the accompanying drawings wherein like reference numerals designate similar parts throughout the various views, reference numeral 10 generally indicates the chassis of a vehicle having the device comprising the present invention operatively installed thereon. Incorporated in the invention is one or more variable electrical resistor elements 12 which are terminally secured to the axles 14 and 16 of the vehicle and to portions of the frame 18 thereof. The variable electrical resistors 12, by means of a suitable conductor 20, are connected to an instrument dial or indicator 22 operable as a galvanometer for indicating the amount of current flow from a battery 24 through the indicator 22 and through the variable electrical resistors 12, the battery 24 being grounded as is conventional.

The dial indicator 22 can consist of a housing 26 having a dial 28 mounted therein, the dial 28 being graduated in any suitable scale so as to indicate tons and fractions thereof which may be loaded on the vehicle. A pointer 30 cooperates with the dial 28 to provide an indication of the actual weight on the vehicle. A glass cover 32 or the like may be used for protecting the pointer 30 and the dial 28. The internal arrangement of the instrument 22 may be in the form of a galvanometer to record the actual electrical flow therethrough which varies, of course, due to the effect of the variable resistors. A switch 34 may be used to control current flow through the instrument 22 so that there cannot be any excessive drain upon the battery 24 when the vehicle is not in use.

Each of the variable resistors 12 includes an outer tubular member 36 which has a threaded upper end 38 for threaded engagement with an upper end member 40, the upper end member having a ball and socket joint 42 connecting the two parts thereof and being provided with a flanged plate, as at 44, for connection to the frame 18 of the vehicle. Slidably telescopingly received within the confines of the outer tubular member 36 is an inner tubular member 46 having a threaded end portion 48 for threaded engagement with a lower end member 50 having a ball and socket joint 52 for universal connection between the two parts thereof, the end member 50 being provided with a flanged plate 54 for connection to the axle of the vehicle.

The upper end member 40 is also internally threaded, as at 56, for threaded reception of the end 58 of a core 60 of insulative material, such as hard rubber or the like. Wrapped around the core 60 is a coil 62 of conductive material which is connected by the conductor 20 to the instrument 22, the conductor passing through an insulative sleeve 64 in the upper end member 40. The lower tubular member 46 is constructed from an electrically conductive material and is, of course, connected to ground and carries four annularly spaced spring type contacts 66 which are adapted to engage the coil 62. Inasmuch as the coil 62 is of a given electrical resistance per unit of length, the resistance of the circuit, including the battery 24 and the indicator 22 will vary inversely proportionally to the amount of weight that is carried by the vehicle so that the pointer can indicate a zero when the vehicle is empty while indicating the correct pay load when the vehicle is carrying a load.

Since from the foregoing, the construction and advantages of this weight indicator for vehicles are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to.

What is claimed as new is as follows:

1. In a weight indicator for a vehicle, a variable electrical resistance element adapted to be attached to the frame of a vehicle and to an axle of the vehicle comprising an outer tubular member having a threaded end portion, an upper end member threadedly secured on said outer tubular member, an inner tubular member in telescoping arrangement with said outer tubular member and having secured thereto a lower end member, an insulative core carried by said upper end member and extending downwardly through said outer tubular member and into said inner tubular member, a coil wrapped about said core, and electrical spring contacts carried by said inner tubular member engaging said coil, said core being threadedly detachably secured to said upper end member.

2. In a weight indicator for a vehicle, a variable electrical resistance element adapted to be attached to the frame of a vehicle and to an axle of the vehicle comprising an outer tubular member having a threaded end portion, an upper end member threadedly secured on said outer tubular member, an inner tubular member in telescoping arrangement with said outer tubular member and having secured thereto a lower end member, an insulative core carried by said upper end member and extending downwardly through said outer tubular member and into said inner tubular member, a coil wrapped about said core, and electrical spring contacts carried by said inner tubular member engaging said coil, said core being threadedly detachably secured to said upper end member, said contacts being spaced about said inner tubular member, said upper end member and said lower end member including ball and socket joints.

References Cited in the file of this patent

UNITED STATES PATENTS

| | | |
|---|---|---|
| Re. 14,475 | Troll | May 21, 1918 |
| 651,473 | Woodford | June 12, 1900 |
| 1,225,094 | Wollensak | May 8, 1917 |
| 1,407,078 | Murray | Feb. 21, 1922 |
| 2,147,500 | Rothenberger et al. | Feb. 14, 1939 |
| 2,491,508 | Mann | Dec. 20, 1949 |

FOREIGN PATENTS

| | | |
|---|---|---|
| 475,162 | Germany | Apr. 19, 1929 |